United States Patent [19]

Bertieri

[11] Patent Number: 5,521,654
[45] Date of Patent: May 28, 1996

[54] COMBINATION EXTENDED NATURAL EYEGLASSES AND CORRECTIVE EYE MAGNIFIER

[76] Inventor: Florenza Bertieri, 211 W. 53rd St., Apt. 4-F, New York, N.Y. 10019

[21] Appl. No.: 144,399

[22] Filed: Nov. 2, 1993

[51] Int. Cl.$^6$ .............................. G02C 7/16; G02C 11/04; G02B 27/34

[52] U.S. Cl. ................. 351/46; 351/57; 351/115; 351/158; 359/802

[58] Field of Search ................................ 362/103, 105; 351/41, 44, 46, 57, 158, 111, 115, 229; 359/480, 798, 799, 802, 803

[56] References Cited

U.S. PATENT DOCUMENTS

| | | | |
|---|---|---|---|
| 1,266,224 | 5/1918 | Day | 351/229 |
| 1,550,582 | 8/1925 | Sheard | 351/229 |
| 3,014,405 | 12/1961 | Swikart | 359/481 |
| 3,273,456 | 9/1966 | Feinbloom | 359/481 |
| 3,350,552 | 10/1967 | Lawrence | 362/105 |
| 3,592,525 | 7/1971 | Schultz | 351/158 X |
| 3,683,168 | 8/1972 | Tatje | 362/105 |
| 3,771,858 | 11/1973 | Bivens | 351/159 |
| 3,967,885 | 7/1976 | Byler | 351/46 |
| 4,181,408 | 1/1980 | Senders | 351/159 |
| 4,236,793 | 12/1980 | Whitney et al. | 351/229 |
| 4,427,272 | 1/1984 | Gernet | 351/173 |
| 4,637,696 | 1/1987 | Wilkins | 351/41 |
| 4,750,812 | 6/1988 | Muraoka et al. | 351/46 X |
| 4,818,095 | 4/1989 | Takeuchi | 351/159 |
| 4,887,194 | 12/1989 | Fields | 362/105 |
| 4,892,384 | 1/1990 | Okamoto | 359/480 |
| 4,988,185 | 1/1991 | Feinbloom | 351/233 |
| 5,002,383 | 3/1991 | Sisler | 351/175 |
| 5,016,999 | 5/1991 | Williams | 351/159 |

Primary Examiner—Anita Pellman Gross
Assistant Examiner—David R. Parsons
Attorney, Agent, or Firm—Richard L. Miller

[57] ABSTRACT

A combination extended natural eyeglasses and corrective eye magnifier comprising a frame, having a front, and having a pair of lens mounting portions separated by a bridge portion. The bridge portion having a light bulb, for illuminating an area in front of the frame. The lens mounting portions having a front slot, a rear slot, and a window having a plurality of small holes between the front slot and rear slot. A magnifying lens can be placed in each the front slot and rear slot. Two temple bows, each having a curved earpiece, are attached to the frame, and extend rearwardly therefrom, the curved earpiece being at an end of each temple bow opposite the frame. The temple bows are attached to the frame with a hinge mechanism, so that they can enter a position where they extend in front of the frame for supporting the frame on a horizontal surface in front of the frame.

11 Claims, 2 Drawing Sheets

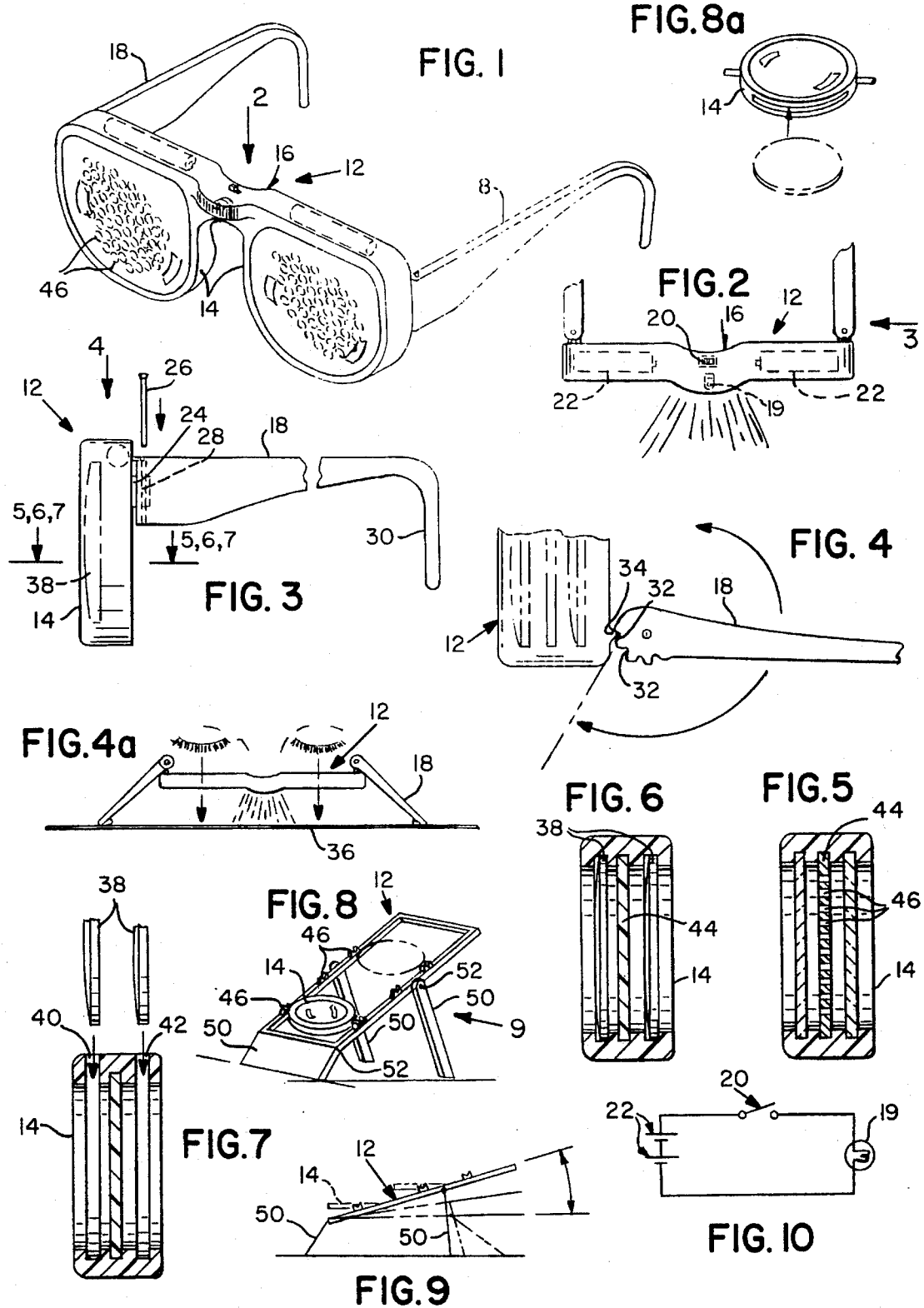

COMBINATION EXTENDED NATURAL EYEGLASSES AND CORRECTIVE EYE MAGNIFIER

BACKGROUND OF THE INVENTION

The invention relates to a combination extended natural eyeglasses and corrective eye magnifier.

There are many eye magnifier units available on the market for the purpose of viewing fine images. There are also many eyeglasses and related devices available for day to day wear. For example U.S. Pat. Nos. 3,014,405 to Swikart; 3,273,456 to Feinbloom; 3,771,858 to Bivens; 4,181,408 to Senders; 4,427,272 to Gernet; 4,887,194 to Fielos; 4,988,185 to Feinbloom and 5,002,383 to Sisler. While these units may be suitable for the particular purpose to which they address, or to general use, they would not be as suitable for the purpose of the present invention as hereafter described.

SUMMARY OF THE INVENTION

It is an object of the invention to produce a combination extended natural eyeglasses and corrective eye magnifier that overcomes the shortcomings of prior art eyeglasses.

It is another object of the invention to produce eyeglasses that have a therapeutic effect on a persons vision.

It is further object of the invention to produce eyeglasses that are economical to manufacture.

It is a still further object of the invention to produce eyeglasses that allow a person to see in dim light, and provide magnification for viewing fine images.

The invention is a combination extended natural eyeglasses and corrective eye magnifier comprising a frame, having a front, and having a pair of lens mounting portions separated by a bridge portion. The bridge portion having a light bulb, for illuminating an area in front of the frame. The lens mounting portions having a front slot, a rear slot, and a window in between the front slot and rear slot. A magnifying lens can be placed in each the front slot and rear slot. Two temple bows, each having a curved earpiece, are attached to the frame, and extend rearwardly therefrom, the curved earpiece being at an end of each temple bow opposite the frame. The temple bows are attached to the frame with a hinge mechanism, so that they can enter a position where they extend in front of the frame for supporting the frame on a horizontal surface in front of the frame.

To the accomplishment of the above and related objects, this invention may be embodied in the form illustrated in the accompanying drawings, attention being called to the fact, however, that the drawings are illustrative only and that changes may be made in the specific construction illustrated and described, within the scope of the claims.

BRIEF DESCRIPTION OF THE DRAWINGS

In the drawings, like reference numerals depict like elements throughout the several views. The drawings are briefly described as follows:

FIG. 1 is a diagrammatic perspective view of a first embodiment of the instant invention.

FIG. 2 is a top plan view with parts broken away, taken in the direction of arrow 2 in FIG. 1, illustrating the illumination feature of the instant invention.

FIG. 3 is a side elevational view, taken in the direction of arrow 3 in FIG. 2.

FIG. 4 is an enlarged diagrammatic top view of a second embodiment, with parts broken away, illustrating the hinge mechanism in greater detail.

FIG. 4a is a diagrammatic perspective view, illustrating the second embodiment being used as a free standing print magnifying device.

FIG. 5 is a diagrammatic cross sectional view of a first typical lens arrangement, taken on line 5—5 of FIG. 3.

FIG. 6 is a diagrammatic cross sectional view of a second typical lens arrangement taken on line 6—6 of FIG. 3.

FIG. 7 is a diagrammatic cross sectional view of a third typical lens arrangement taken on line 7—7 of FIG. 3, but with two of the lenses separated therefrom.

FIG. 8 is a diagrammatic perspective view of a third embodiment, illustrating the combination of lenses used in an adjustable stand, for different levels of magnification.

FIG. 8a is a diagrammatic perspective view illustrating a lens holding frame with a lens separated therefrom.

FIG. 9 is a diagrammatic side elevational view, taken in the direction of arrow 9 in FIG. 8.

FIG. 10 is an electrical schematic diagram of the instant invention.

DETAILED DESCRIPTION OF THE PREFERRED EMBODIMENT

Figure 11:
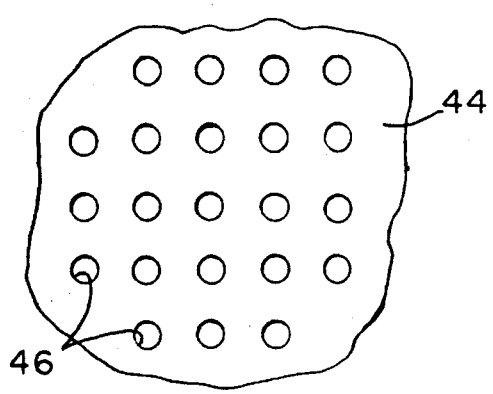
Figure 12:
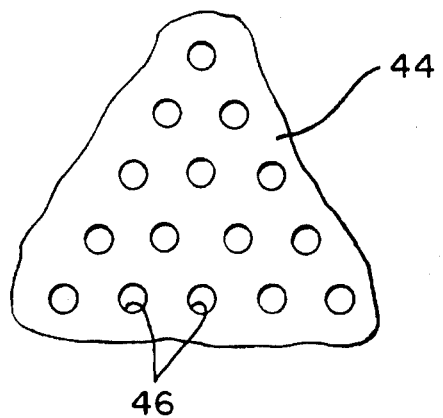

FIG. 1 illustrates a frame 12 having two lens mounting portions 14, connected by a bridge portion 16. Extending rearwardly from the frame 12 are two temple bows 18.

FIG. 2 is a top plan view, illustrating the frame 12. A light bulb 19 is mounted in the bridge portion 16. The light from the bulb 19 is directed to illuminate the area forward of the frame 12, to enhance the viewing of said area. The light bulb 19 is selectively activated and deactivated by a switch 20. The light bulb is powered by a pair of batteries 22, shown in phantom. Referring to FIG. 10, the light bulb 19 is connected in series with the switch 20, and a pair of batteries 22. To activate the light bulb 19 the switch 20 is closed to complete the circuit and allow electricity from the batteries 22 to reach the light bulb 19.

FIG. 3 is a side elevational view, showing the connection of the frame 12 to the temple bow 18 with a hinge 24 attached to the frame 12. A hinge pin 26 extends into a hinge pin bore 28, which extends through both the hinge 24 and the temple bow 18, for connecting the temple bore 28 to the hinge 24, and for allowing rotation of the temple bow about the hinge pin. A curved earpiece 30 at an end of the temple bow 18 opposite the frame 12, helps to hold the eyeglasses in place on the head of a person wearing the eyeglasses. A magnifying lens 38, shown in phantom, is present within the lens mounting portion 14.

In a second embodiment, the temple bows 18 allow rotation about the hinge pin 26 through an angle greater than 180 degrees, so that the temple bows 18 can enter a position where the curved earpiece 30 of the temple bows 18 extend in front of the frame 12, for supporting the frame on a horizontal surface 36 in front of the frame 12, as shown in FIG. 4a. When in this position, the eyeglasses give a person looking through them a magnified view of the horizontal surface in front of the eyeglasses. The viewing of the horizontal surface is further enhanced by illumination provide by the light bulb in the bridge portion.

Referring to FIG. 4, each temple bow 18 has a plurality of notches 32, which engage a tab 34 on the frame 12, for adjusting the angle of the temple bow 18, relative to the frame 12, and for holding the temple bow 18 in the chosen position.

In FIG. 7, the lens mounting portion 14, has a front slot 40 and a rear slot 42, each containing a magnifying lens 38. The magnifying lenses can be inserted and removed from their respective slots. They can be replaced with another type of lens, as in FIG. 5. A window 44, mounted between the two lenses can be tinted, as in FIG. 6, or can have a plurality of holes 46, as in FIG. 5. A path of vision for a person wearing the glasses is through a lens present in the front slot 40, through the window 44, and through a lens in the rear slot 42. The holes 46 are present in the path of vision through the eyeglasses, so that a person wearing the eyeglasses looks through the holes. The holes can have a therapeutic effect for the person wearing the eyeglasses. Looking through the holes also reduces background glare which would be otherwise present if the holes were not provided. Typically the holes are approximately 0.062 inches in diameters and located on center distances of 0.125 inches. The hole pattern centers can be either on a square grid or a equilateral grid.

FIG. 8 illustrates a third embodiment of the invention, in which the lens mounting portion 14, can be supported by the frame 12 in several different mounting positions 48, for adjusting the height of the lens mounting portion above the horizontal surface 36 in front of the frame 12. The angle that the frame makes with the horizontal surface 36 can be altered with adjustable legs 50, frictionally mounted on leg hinges 52, as shown in FIG. 9.

What is claimed is:

1. A combined eyeglasses and magnifier, comprising:
    a) a frame, having a front;
    b) a lens mounting portion, supported by the frame, the lens mounting portion having two front socket forming slots and two socking forming rear slots, each extending vertically and being open at a top for receiving a selected lens, and through which top openings respective selected lenses can be easily inserted and removed from respective socket forming slots;
    c) a window, mounted between the lens slots;
    d) two pairs of lenses, mountable in the slots, for magnifying an image; and
    e) a light bulb, mounted in the frame, for illuminating an area before the front of the frame.

2. The apparatus as recited in claim 1 where the window further has a substrate formed with a plurality of holes.

3. The apparatus as recited in claim 1 further comprising a pair of temple bows, each having a curved earpiece, the temple bows being attached to the frame with hinges about which the temple bows can be removed from a position in which they extend behind the frame to a position in which they extend in front of the frame where the curved earpieces can rest on a horizontal surface in front of the frame, to allow viewing of the horizontal surface and interengageable tab and notch means are provided on adjacent portions of the temple bows and frame for maintaining the temple bows in respective positions.

4. A combined eyeglasses and magnifier, comprising:
    a) a frame having a front;
    b) a lens mounting portion, supported by the frame, the lens mounting portion having a front slot and a rear slot, each for receiving a lens, and for allowing the lens to be easily inserted and removed;
    c) a window, mounted between the lens slots and having a substrate formed with a plurality of holes;
    d) a light bulb, mounted in the frame, for illuminating an area before the front of the frame; and
    e) a pair of lenses, mountable in the slots, for magnifying an image.

5. The apparatus as recited in claim 4, where said plurality of holes, are approximately 0.062 inches in diameter and have centers located approximately 0.125 inches apart from each other.

6. The apparatus as recited in claim 5, where said plurality of holes have their centers located in a square grid.

7. The apparatus as recited in claim 5, where said plurality of holes have their centers located in an equilateral triangular grid.

8. A combined eyeglasses and magnifier, comprising:
    a) a frame, having a front;
    b) a lens mounting portion, supported by the frame, the lens mounting portion having a front slot and a rear slot, each for receiving a lens, and for allowing the lens to be easily inserted and removed;
    c) a window, mounted between the lens slots and having a substrate formed with a plurality of holes; and
    d) a pair of lenses, mountable in the slots, for magnifying an image.

9. The apparatus as recited in claim 8, where said plurality of holes, are approximately 0.062 inches in diameter and have centers located approximately 0.125 inches apart from each other.

10. The apparatus as recited in claim 9, where said plurality of holes have their center located in a square grid.

11. The apparatus as recited in claim 9, where said plurality of holes have their centers located in an equilateral triangular grid.

* * * * *